Figure 1:
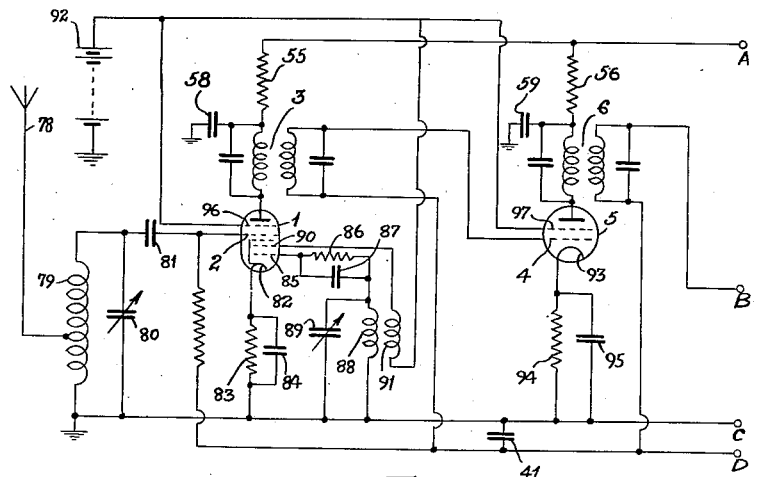

Sept. 12, 1939.  F. T. LETT  2,172,477

WIRELESS RECEIVING APPARATUS

Filed Aug. 16, 1935 2 Sheets-Sheet 1

Inventor:
F. T. LETT
by: J. Appenlaener
Atty.

Sept. 12, 1939.  F. T. LETT  2,172,477
WIRELESS RECEIVING APPARATUS
Filed Aug. 16, 1935  2 Sheets-Sheet 2

Inventor:
F. T. LETT
By: J. Oppenheimer, atty.

Patented Sept. 12, 1939

2,172,477

UNITED STATES PATENT OFFICE 2,172,477

WIRELESS RECEIVING APPARATUS

Frederic Tom Lett, Iver, England, assignor to Electric & Musical Industries Limited, Hayes, England, a company of Great Britain Application August 16, 1935, Serial No. 36,566
In Great Britain August 16, 1934

12 Claims. (Cl. 250—20)

The present invention relates to wireless receiving apparatus.

It is known in wireless receiving apparatus to provide a device whereby visual indication of the reception of a signal is given. Such a device usually comprises a milliammeter or other current indicator connected in the anode circuit of one or more valves the anode current of which varies with the strength of the applied signal. Such a valve is in general of the so-called variable-mu type, it being arranged that the grid is made more negative with respect to the cathode as the strength of the applied signal increases. The current through the indicating device is therefore large when the applied signal strength is small. As the wavelength to which the resonant circuits of the receiver are tuned is varied, in order to receive a carrier wave, the current through the indicating device varies and has a minimum value when the wavelength of the carrier coincides with the wavelength to which the circuits are tuned. The indicator therefore shows the correct setting of the tuning device of the receiver.

When however the receiver employs band-pass circuits the current shown by the indicator remains substantially constant over an appreciable range of settings of the tuning device or may show two minimum values at the humps of the resonance curve. The indicator is therefore of very little use in showing the position of the tuning device for which the frequency of the carrier to be received coincides with the centre of the resonance curve of the tuned circuits of the receiver.

It is also known to connect a tuning indicator in a "Q" circuit, that is to say a circuit adapted to mute the receiver excepting when a signal of more than a predetermined strength is present. When a "Q" circuit is associated with an amplifier of which the gain is so controlled that the output is substantially constant over a wide range of input potentials the indicator associated with the "Q" circuit will give substantially its maximum reading when any signal is in tune, provided that the signal potential exceeds a certain minimum value. The indicator therefore gives no indication of the strength of the applied signal.

It is an object of the present invention to overcome the above difficulties and to provide an arrangement whereby a tuning indicator may be used in a wireless receiver employing band-pass tuning to give indication both of the true setting of the tuning device to receive a signal and of the strength of the signal.

According to the present invention there is provided a wireless receiver comprising a thermionic amplifier associated with means whereby the amplification of the amplifier is reduced as the input thereto is increased, said amplifier including one or more tuned circuits having resonance curves exhibiting band-pass characteristics, wherein there is provided a tuning indicator the indication of which is a function both of the amplification of the thermionic amplifier and a current or voltage set up in an auxiliary sharply tuned circuit associated with said receiver.

According to a feature of the present invention in a wireless receiver comprising a thermionic amplifier associated with means whereby the amplification of the amplifier is reduced as the input of the amplifier increases and means adapted to mute said receiver except when a carrier of more than a predetermined minimum strength and of frequency substantially coinciding with the frequency to which the receiver is tuned is applied to said receiver, there is provided a tuning indicator the indication of which is a function both of the amplification of the thermionic amplifier and a current or voltage in a circuit associated with the muting means.

According to a further feature of the present invention in a wireless receiver comprising a thermionic amplifier provided with automatic gain control and a muting valve associated with muting means whereby this valve is biased substantially to cut-off except when there is received a signal having a carrier frequency which substantially concides with the centre point of the resonance curve of one or more tuned circuits of said receiver, there is provided a tuning indicator the indication of which is controlled in accordance with both the anode current of the thermionic amplifier and either the anode current of the muting valve or a current in a circuit of said muting means.

Figure 3:
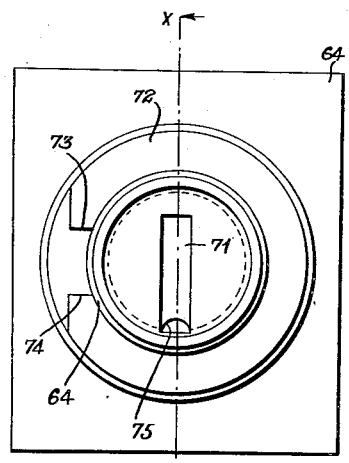
Figure 4:
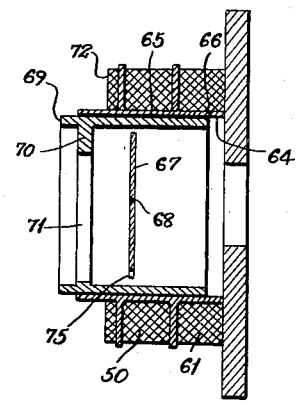
Figure 2:
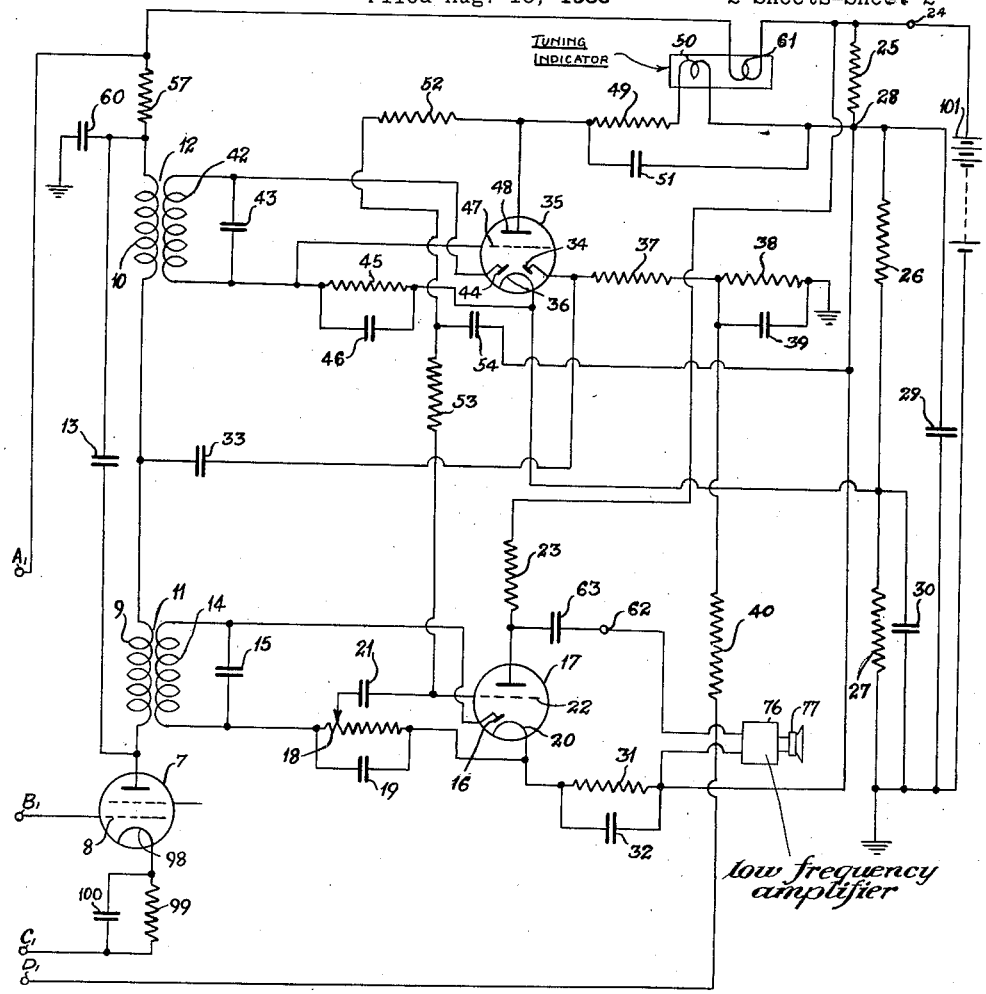
Figure 5:
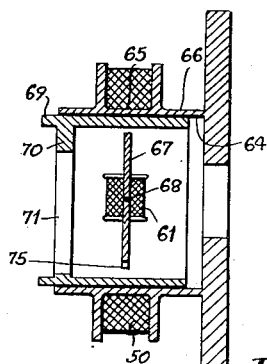
Figure 6:
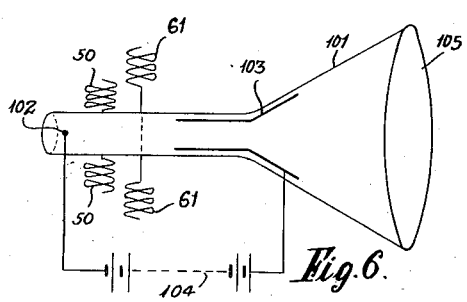

The invention will now be described by way of example with reference to the accompanying diagrammatic drawings wherein Figs. 1 and 2, which are adapted for interconnection show a circuit arrangement incorporating the present invention as applied to a heterodyne receiving apparatus, Fig. 3 shows a view in front elevation of the tuning indicator of Fig. 2, Fig. 4 shows a view in section along the line X—X of Fig. 3, Fig. 5 shows a view in section of a modified form of tuning indicator, and Fig. 6 shows another form of tuning indicator.

Referring to Figs. 1 and 2 of the drawings, a heptode valve 1 is adapted to operate in known manner as a frequency changer. High frequency signals are received by an aerial 78 and fed to a tunable parallel resonant circuit comprising an inductance 79 shunted by a variable condenser 80. Oscillations are fed by means of condenser 81 to control grid 2 of valve 1. The cathode 82 of valve 1 is connected to earth through a biasing resistance 83 shunted by a decoupling condenser 84. The innermost grid 85 of valve 1 acts as an oscillator control grid and is connected through a resistance 86 shunted by a condenser 87 to one end of a parallel tunable circuit comprising an inductance 88 and a variable condenser 89. The second grid 90 of valve 1 acts as an oscillator anode and is connected through a coil 91, which is back-coupled to inductance 88, to the positive pole of a source of high tension current indicated generically by battery 92, the negative pole of battery 92 being earthed. The primary winding of an intermediate frequency transformer 3 is connected in the anode circuit of valve 1. The secondary winding of transformer 3 is coupled to the control grid 4 of a screen grid valve 5 which operates as an intermediate frequency amplifier, the primary winding of a second intermediate frequency transformer 6 being connected in its anode circuit. The cathode 93 of valve 5 is connected to earth through a biasing resistance 94 shunted by a decoupling condenser 95. The screen grids 96, 97 of valves 2, 5 are connected to battery 92.

The degree of coupling between the primary and secondary windings of transformers 3 and 6 is adjusted so that these transformers exhibit band-pass characteristics.

Terminals A, B, C, D of Fig. 1 are connected respectively to terminals A₁, B₁, C₁, D₁ of Fig. 2.

In Fig. 2, a screen grid valve 7 is connected to operate as a further intermediate frequency amplifying valve. Valve 7 has signals fed to its control grid 8 from terminal B₁. The cathode 98 of valve 7 is connected to terminal C₁ through a biasing resistance 99 shunted by a decoupling condenser 100.

In the anode circuit of valve 7 there are connected in series the primary windings 9, 10 of two intermediate frequency transformers 11, 12. A condenser 13 is shunted across primary windings 9, 10. The secondary winding 14 of transformer 11 is tuned to the intermediate frequency by means of a condenser 15 and is connected at one end to the diode anode 16 of a diode-triode valve 17 and at the other end, through a load resistance 18 shunted by a condenser 19 to the cathode 20 of valve 17. A tapping point on resistance 18 is connected through a condenser 21 to the control grid 22 of valve 17. The anode of valve 17 is connected through a coupling resistance 23 to the terminal 24 to which the positive pole of a source denoted generically by battery 101 of high tension current is connected, the negative terminal being earthed.

Between terminal 24 and earth there are connected three resistances 25, 26 and 27 in series. The common point 28 of resistances 25 and 26 is connected to earth through a condenser 29 and resistance 27 is shunted by a condenser 30. The cathode 20 of valve 17 is connected to point 28 through a resistance 31 shunted by a condenser 32.

The common point of primary windings 9, 10 is connected through a condenser 33 to a diode anode 34 of a duo-diode-triode valve 35 the cathode 36 of which is connected to the common point of resistances 26 and 27. Diode anode 34 is also connected, through two resistances 37, 38 in series, to earth, resistance 38 being shunted by a condenser 39. The common point of resistances 37, 38 is connected through a resistance 40, through terminal D₁ to terminal D which is connected through a grid leak resistance to grid 2 of valve 1 and through the secondary windings of transformers 3 and 6 to grids 4 and 8 of valves 5 and 7. A decoupling condenser 41 is connected between terminal D and earth.

The secondary winding 42 of transformer 12 is of low resistance and is tuned by condenser 43 to the intermediate frequency. One end of winding 42 is connected to diode anode 44 of valve 35 and the other end is connected through a load resistance 45 shunted by a condenser 46 to cathode 36. The end of resistance 45 remote from the cathode is conductively connected to the control grid 47 of valve 35. The anode 48 of valve 35 is connected through a resistance 49 and a coil 50 (the purpose of which will be discussed later) in series to point 28, a condenser 51 being also connected between anode 48 and point 28. Anode 48 is also connected through two resistances 52, 53 in series to control grid 22 of valve 17, a condenser 54 being connected between the common point of these resistances and point 28.

Decoupling resistances 55, 56, 57 and their respective decoupling condensers 58, 59, 60 are connected with the anode circuits of their respective valves 1, 5, 7 and the anode leads are then connected together and through a coil 61 to terminal 24.

The operation of the circuit is as follows:—

A part of the intermediate frequency output of valve 7 is rectified by diode 16, 20 and the modulation frequency potential differences thereby set up across resistance 18 are fed to the control grid 22 of the triode part of valve 17 which, when its control grid 22 is suitably biased, acts as a low frequency amplifier. The low frequency amplifier 76 feeding a loudspeaker 77 has its input connected to terminal 62 which is coupled to the anode of valve 17 by means of a coupling condenser 63.

A further part of the intermediate frequency output of valve 7, impressed on diode 34—36 by condenser 33 is rectified by the diode and the rectified current sets up across resistance 38 a potential which is smoothed by condenser 39 and fed as bias to the control grids 2, 4, 8 of valves 1, 5, 7, these grids being of the so-called variable-mu type. The gain of the frequency changer and the intermediate frequency amplifier is thereby controlled and an output substantially independent of incoming signal strength, is supplied by valve 7 as long as the signal strength exceeds a predetermined minimum. For very weak signals the intermediate frequency potential difference between diode anode 34 and earth does not exceed the negative bias due to the flow of current through resistance 27 and therefore no additional bias is applied to the variable-mu grids. This produces the so-called delayed automatic gain control.

The circuit comprising the secondary winding 42 of transformer 12 and condenser 43 is sharply tuned to the intermediate frequency and therefore no substantial voltage is applied to diode 44, 36 unless the wanted signal is accurately tuned in. When the receiver is accurately tuned to a signal, current flows in resistance 45, the a. c. components are smoothed out by condenser 46 and grid 47 becomes negative with respect to cathode 36. The anode current of valve 35 therefore decreases and, owing to the presence of resistance 49 the potential of anode 48 becomes more positive. The grid 22 of valve 17 therefore also becomes more positive.

In the absence of a signal the anode current in valve 35 is large and therefore there is a considerable potential difference across resistance 49. Since the cathode 20 of valve 17 is at substantially the same potential as point 28 and since the grid 22 of valve 17 is at substantially the same potential as anode 48, the potential difference across resistance 49 appears as negative bias on grid 22. In the absence of a signal this bias is sufficient to render valve 17 inoperative as a low frequency amplifier. When a signal is accurately tuned, grid 22 becomes more positive as explained above and valve 17 becomes operative as a low frequency amplifier and signals are heard from the loudspeaker 77.

Owing to the action of the automatic gain control the anode current of valve 35 and hence the current in coil 50 will have a value which is independent of the signal being received as long as the signal is accurately in tune and as long as the incoming signal strength exceeds a predetermined minimum. When no signal is accurately in tune the current in coil 50 will have another value which will be considerably greater than the previously mentioned value.

The current in coil 61 will have a maximum value when no signal is incident on the aerial and will fall progressively as the strength of the received signal increases. When a powerful signal is in tune the current in coil 61 will fall to a comparatively small value.

Coils 50 and 61 are arranged to control, in like sense, a visual tuning indicator. Thus, when the tuning control of the receiver is operated in order to bring a desired carrier wave into tune, the indicator begins to give an indication in response to a decrease in current in the coil 61 as the frequency produced by the frequency changer enters the pass band of transformers 3, 6. As the signal is brought more nearly into tune, this indication rapidly rises to a value dependent on the incident signal strength. When the frequency produced by the frequency changer coincides with the resonant frequency of circuit 42, 43 (which is adjusted to coincide with the centre of the pass band of transformers 3, 6) diode 44, 36 becomes operative and reduces the anode current in valve 35, thereby removing the muting bias from grid 22 of muting valve 17. The indicator reading is then increased by an amount equivalent to the change of current in valve 35 (the "Q" valve).

If the tuning control is turned still further the "Q" valve again mutes the receiver and the visual indicator falls to a value dependent on the signal strength.

It will be seen therefore firstly that the reading of the indicator when a signal is in tune is dependent on the signal strength and secondly, that a small amount of detuning gives a considerable change in the reading and at the same time the receiver becomes muted.

If the time constant of resistance 52 and condenser 54 is made long (one or two seconds, for example) it is possible, by operating the tuning control rapidly, to pass from one station to another without allowing condenser 54 to discharge sufficiently to remove the muting of the receiver at any intermediate station. Each station, as its wavelength is passed through, gives a deflection of the indicator dependent on its signal strength at the receiver and an additional indication of the exact tuning position due to change of current in the "Q" valve, but no sound is heard from the loudspeaker 77. When however, the tuning control is allowed to remain with a signal in tune (as shown by the tuning indicator), for a period of time comparable with the time constant of condenser 54 and resistance 52, then condenser 54 discharges sufficiently to remove the muting from the receiver.

It has been stated above that the resonant frequency of circuit 42, 43 is adjusted to the centre of the pass band of transformers 3, 6. In some cases this may not be the most desirable adjustment. For example, if signals are to be received which have a carrier and only one sideband it is preferably arranged so that the resonant frequency of circuit 42, 43 is near to one side of the pass band of transformers 3, 6 and that the sideband frequencies lie within this pass band.

Figs. 3 and 4 show in greater detail one suitable form of tuning indicator. A moulding 64 of insulating material has two peripheral slots 65 and 66 and in each of which a circular coil 50 and 61 is wound. A circular vane 67 of magnetic material is pivoted about a diametrical axis 68 perpendicular to the axis of the coils, axis 68 being so located that current flowing in the coil 50 produces a larger deflecting force on vane 67 than is produced by an equal current in the coil 61. Another moulding 69 in the form of a cylinder, and having a diaphragm 70 in which there is a rectangular aperture 71, is located within moulding 64. A magnet 72 having poles 73, 74 is located around moulding 64 and serves to damp the motion of disc 67 and centre it so that when no current passes through the coils 50, 61 it remains in a vertical position as shown. At its lowest point a small portion is cut away as shown at 75 in Fig. 3. When a suitable light source is placed behind disc 67 in Fig. 3 (i. e., to the right of the disc in Fig. 4) a small beam of light will pass through the bottom of aperture 71.

The coils in slots 65 and 66 are connected as coils 50 and 61 respectively of Fig. 2. When no signal is in tune the currents in coils 50 and 61 both have maximum values and disc 67 tends to assume a horizontal position and the column of light seen in aperture 71 rises to a height dependent on the relative magnitudes of the deflecting and restoring forces acting on disc 67. As explained with reference to Figs. 1 and 2 the current in coil 61 falls when a signal is tuned by an amount dependent on the incident signal strength and the current in coil 50 is reduced by a constant amount whenever a signal of more than a predetermined strength is accurately in tune. The depression of the column of light therefore shows both the exact tuning position of a signal and also the approximate strength of the signal.

The disposition of the coils ensures that the "Q" coil (coil 50) has a greater effect than the coil associated with the controlled valves (coil 61) and therefore the exact tuning position is very marked whether the station being received is strong or weak. Alternatively, similar results can be obtained with coils 50, 61 symmetrically disposed with respect to disc 67, coil 50 then having a larger number of turns than coil 61.

A modification of the tuning indicator of Figs. 3 and 4 is shown in Fig. 5. In this figure the magnet 72 of Figs. 3 and 4 is omitted, the disc 67 is of non-magnetic material and coil 61 takes the form of a moving coil attached to disc 67. In other respects this indicator is similar to that of Figs. 3 and 4.

The coils 50 and 61 of Fig. 5 are so arranged that the moving coil 61 takes up a position which is dependent on the product of the currents in the two coils 50 and 61. (In the arrangement of Figs. 3 and 4 the deflection is dependent on the sum of the magnetic effects of the two coils 50 and 61.) The moving coil 61 of Fig. 5 or the disc 67 of Figs. 3 and 4 may be arranged to control various forms of visual indicator. For example, the moving member may carry a mirror adapted to reflect a beam of light on to a screen.

Another visual indicator which may be employed is shown in Fig. 6 and comprises a cathode ray tube 101 having a cathode 102 for emitting electrons, an accelerating electrode 103 maintained at a suitable positive potential with respect to the cathode 102 by means of a source of potential indicated generically by battery 104, and a fluorescent screen 105. Two pairs of deflecting coils 50 and 61 are provided, these coils representing the coils 50, 61 of Fig. 2. The pair 59 which is connected in the "Q" circuit is preferably arranged to have a greater controlling effect than the pair 61 which is connected in the circuit of the gain controlled valves, the two pairs of coils 50 and 61 being so located that they deflect the ray in the same direction. If electrostatic deflection is employed two pairs of plates may be located in parallel planes the plates of each pair facing one another and being disposed on opposite sides of the ray; the pair nearer the cathode is connected to the anode circuit of the "Q" valve in such a way that the potential difference between the plates depends upon the anode current of this valve; the further pair is connected in a similar manner to the anode circuit of the gain controlled valves.

Alternatively, with either electromagnetic or electrostatic deflection in a cathode ray indicator, the deflecting means may be arranged so that the deflections due to the "Q" valve and the gain controlled valves are at right angles to one another. A deflection in one direction then indicates the exact tuning position and a deflection at right angles to this direction indicates the strength of the signal being received.

Forms of tuning indicator other than those described may also be employed.

I claim:

1. A modulated carrier wave receiver comprising a thermionic amplifier including at least one tuned circuit having a band-pass characteristic, means for applying a received modulated carrier to said amplifier, means for reducing the gain of said amplifier automatically in response to increase of amplitude of said received carrier, a sharply tuned circuit connected with said amplifier, a tuning indicator and means for controlling the indication of said indicator in dependence upon both the gain of said amplifier and the current in said sharply tuned circuit.

2. A modulated carrier wave receiver comprising a thermionic amplifier including at least one tuned circuit having a band-pass characteristic, means for applying a received modulated carrier to said amplifier, means for reducing the gain of said amplifier automatically in response to increase of amplitude of said received carrier, a modulation responsive device, sharply tuned means, responsive to said amplifier output and independent of said gain reducing means, for muting said modulation responsive device except when the frequency of said received signal substantially coincides with the resonant frequency of said tuned circuit and the amplitude of said received signal exceeds a predetermined minimum value, a tuning indicator and means for controlling the indication of said indicator in dependence upon both the gain of said amplifier and the condition of said muting means.

3. A modulated carrier wave receiver comprising a thermionic valve amplifier having at least one tuned circuit and being provided with automatic gain control, means for applying a received carrier to said amplifier, a muting valve, sharply tuned muting means independent of the action of said gain control for biasing said valve substantially to cut-off except when the frequency of said received carrier substantially coincides with the centre point of the resonance curve of said tuned circuit, a tuning indicator and means for controlling the indication of said indicator in dependence upon both the gain of said amplifier and the bias provided by said muting means.

4. A modulated carrier wave receiver comprising a thermionic valve amplifier having at least one tuned circuit and being provided with automatic gain control, means for applying a received carrier to said amplifier, a muting valve, muting means for biasing said valve substantially to cut-off except when the frequency of said received carrier substantially coincides with the centre point of the resonance curve of said tuned circuit, a tuning indicator having first and second deflecting coils, a pivoted indicating member adapted to be deflected electromagnetically by current flowing in either of said coils, means for passing a current dependent on the gain of said amplifier through said first coil and means for passing a current dependent on the bias provided by said muting means through said second coil.

5. A modulated carrier wave receiver comprising a thermionic valve amplifier having at least one tuned circuit and being provided with automatic gain control, means for applying a received carrier to said amplifier, a muting valve, muting means for biasing said valve substantially to cut-off except when the frequency of said received carrier substantially coincides with the centre point of the resonance curve of said tuned circuit, a tuning indicator having first and second deflecting coils, a pivoted indicating member adapted to be deflected electromagnetically by current flowing in either of said coils, means for passing the anode current of a gain controlled valve of said amplifier through said first coil and means for passing a current dependent on the bias provided by said muting means through said second coil.

6. A modulated carrier wave receiver comprising a thermionic valve amplifier having at least one tuned circuit and being provided with automatic gain control, means for applying a received carrier to said amplifier, a muting valve, muting means for biasing said valve substantially to cut-off except when the frequency of said received carrier substantially coincides with the centre point of the resonance curve of said tuned circuit, a moving coil tuning indicator having a fixed coil and a moving coil, means for passing a current dependent on the gain of said amplifier through one of said coils and means for passing a current dependent on the bias provided by said muting means through the other of said coils.

7. A modulated carrier wave receiver according to claim 6, wherein said tuning indicator is so constructed and arranged that the deflection of said moving coil is substantially proportional to the product of the currents in said fixed coil and said moving coil.

8. A modulated carrier wave receiver comprising a thermionic amplifier including at least one tuned circuit having a band-pass characteristic, means for applying a received modulated carrier to said amplifier, means for reducing the gain of said amplifier automatically in response to increase of amplitude of said received carrier, a modulation responsive device, means for muting said modulation responsive device except when the frequency of said received signal substantially coincides with the resonant frequency of said tuned circuit and the amplitude of said received signal exceeds a predetermined minimum value, a cathode ray tube tuning indicator having a source of electrons, a fluorescent screen, means for accelerating said electrons towards said screen, first deflecting means for deflecting said electrons in dependence upon the gain of said amplifier and second deflecting means for deflecting said electrons in dependence upon the condition of said muting means.

9. A modulated carrier wave receiver comprising a thermionic amplifier including at least one tuned circuit having a band-pass characteristic, means for applying a received modulated carrier to said amplifier, means for reducing the gain of said amplifier automatically in response to increase of amplitude of said received carrier, a modulation responsive device, independent of the action of said gain control, means sharply tuned for muting said modulation responsive device except when the frequency of said received signal substantially coincides with the resonant frequency of said tuned circuit and the amplitude of said received signal exceeds a predetermined minimum value, a tuning indicator, first controlling means for controlling the indication of said indicator in dependence on the gain of said amplifier and second controlling means for controlling the indicaton of said indicator in dependence on the condition of said muting means, the magnitude of the control of said indicator by said second controlling means being greater than the maximum magnitude of the control of said indicator by said first controlling means.

10. In an electrical wave transmission system, a wave transmission tube, means responsive to an increase in wave amplitude for reducing the gain of said tube, a current responsive device for indicating wave amplitude under the control of said means, a second means, responsive to waves of a predetermined frequency and amplitude, for permitting normal wave transmission through the system and preventing such transmission for waves of a different frequency and lesser amplitude, a second current responsive device for indicating wave resonance under the control of said second means.

11. In an electrical wave transmission system, a wave transmission tube, means responsive to an increase in wave amplitude for reducing the gain of said tube, a current responsive device for indicating wave amplitude under the control of said means, a second means, responsive to waves of a predetermined frequency and amplitude, for permitting normal wave transmission through the system and preventing such transmission for waves of a different frequency and lesser amplitude, a second current responsive device for indicating wave resonance under the control of said second means, and a visual indicator means associated with said two devices for producing a conjoint indication of the wave amplitude and resonance.

12. In an electrical wave transmission system, a wave transmission tube, means responsive to an increase in wave amplitude for reducing the gain of said tube, a current responsive device for indicating wave amplitude under the control of said means, a second means, responsive to waves of a predetermined frequency and amplitude, for permitting normal wave transmission through the system and preventing such transmission for waves of a different frequency and lesser amplitude, a second current responsive device for indicating wave resonance under the control of said second means, and a cathode ray tube electrically associated with said two devices to produce visual indications representative of wave amplitude and resonance.

FREDERIC TOM LETT.